United States Patent [19]

Rosenbaum

[11] 4,326,750
[45] Apr. 27, 1982

[54] GATE ASSEMBLY AND CONTROL ASSEMBLY THEREFOR

[75] Inventor: Glen F. Rosenbaum, Elk Point, S. Dak.

[73] Assignee: CMI Corporation, Oklahoma City, Okla.

[21] Appl. No.: 104,316

[22] Filed: Dec. 17, 1979

[51] Int. Cl.³ .............................................. B60P 1/56
[52] U.S. Cl. .................................. 298/35 M; 91/453; 105/240; 298/37
[58] Field of Search .................. 105/240; 91/367, 453; 298/24, 25, 26, 27, 28, 29, 30, 31, 32, 33, 34, 35 R, 35 M, 36, 37, 8 H

[56] References Cited

U.S. PATENT DOCUMENTS

| | | | |
|---|---|---|---|
| 2,237,299 | 4/1941 | Benbow et al. | 298/22 C X |
| 2,283,753 | 5/1942 | Harcum | 91/453 X |
| 3,145,057 | 8/1964 | Taggart | 105/240 X |
| 3,180,514 | 4/1965 | Horton | 414/620 |
| 3,404,650 | 10/1968 | Miller et al. | 105/240 X |
| 3,427,075 | 2/1969 | Kress et al. | 298/35 M |
| 3,596,565 | 8/1971 | Atkinson | 298/35 M X |

*Primary Examiner*—Leslie J. Paperner
*Attorney, Agent, or Firm*—Dunlap & Codding

[57] ABSTRACT

An improved gate assembly and gate control assembly for operatively controlling the movement of the gate assembly in material discharging equipment is provided wherein the gate assembly comprises a first and second clamshell gate member, a connecting assembly for pivotably connecting the first and second clamshell gate members to the equipment and substantially synchronizing the movement of the first and second clamshell gate members between a closed position, and an open position, a gate moving assembly operably connected to the first and second clamshell gate members for moving the first and second gate members between the closed and the open position, and the gate control assembly operably connected to the gate moving assembly, the gate control assembly selectively activating the gate moving assembly such that the first and second gate clamshell members are moved between the closed position and the open position. The gate control assembly is further characterized as having a first operational mode and a second operational mode. In the first operational mode the gate control assembly is acutated for positive closure of the first and second clamshell gate members. In the second operational mode the gate control assembly selectively moving the first and second clamshell gate members between the closed position and the open position.

24 Claims, 7 Drawing Figures

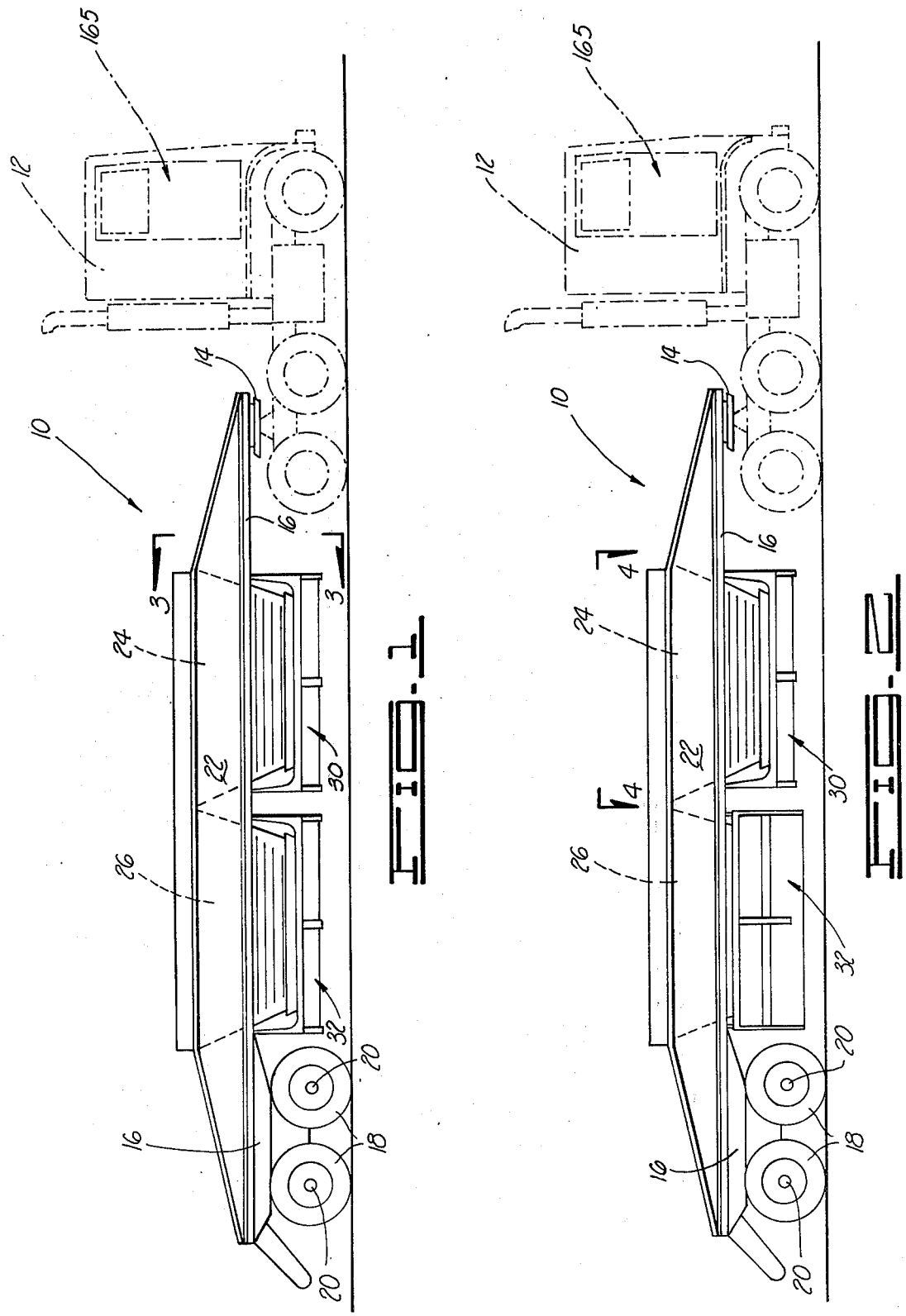

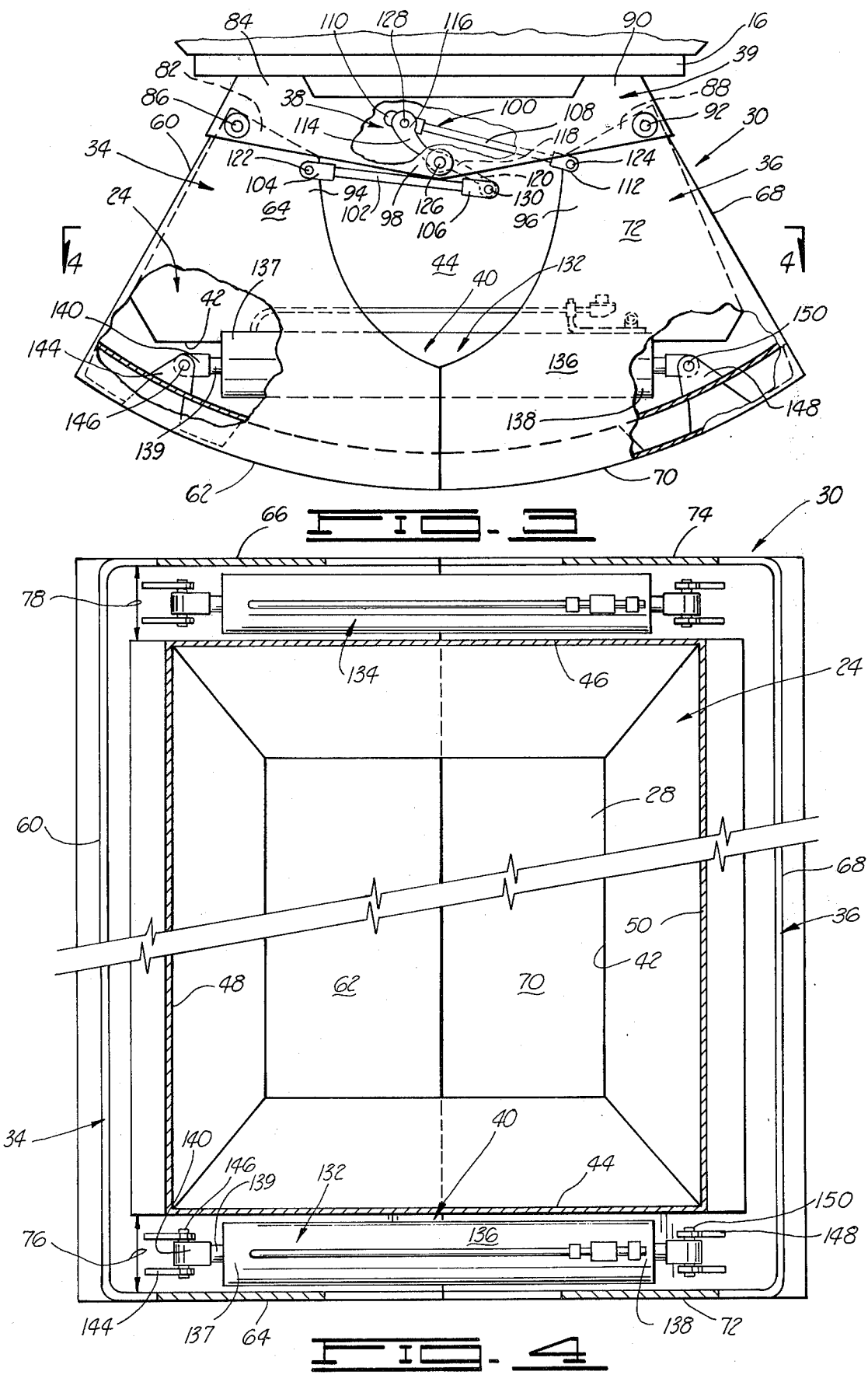

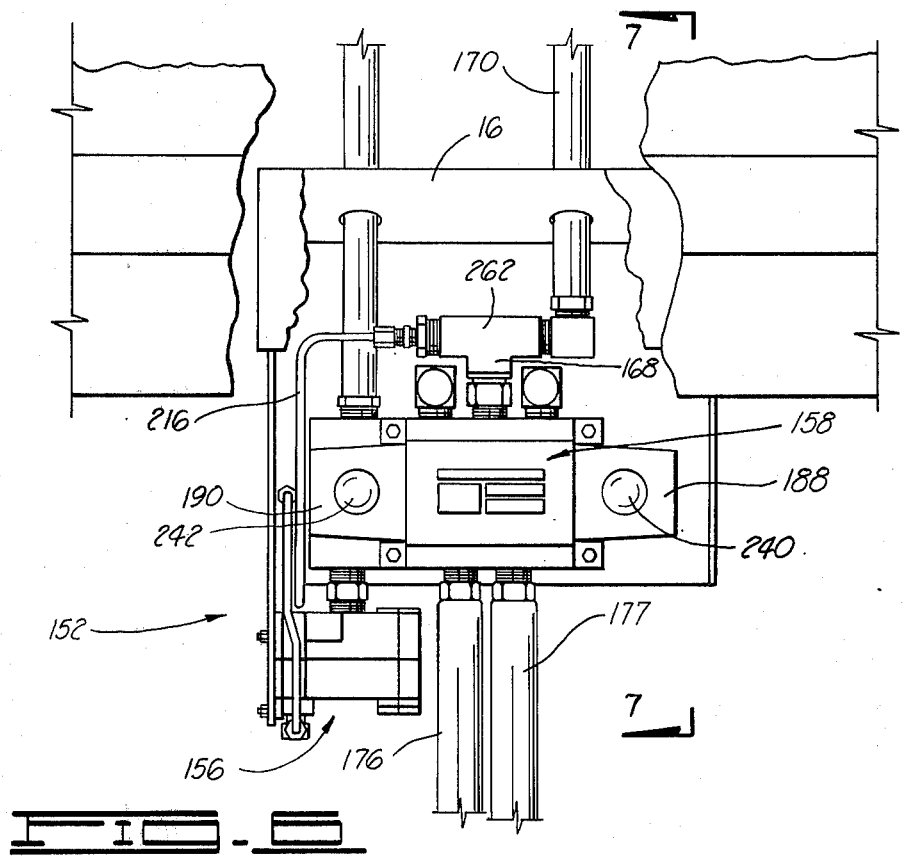
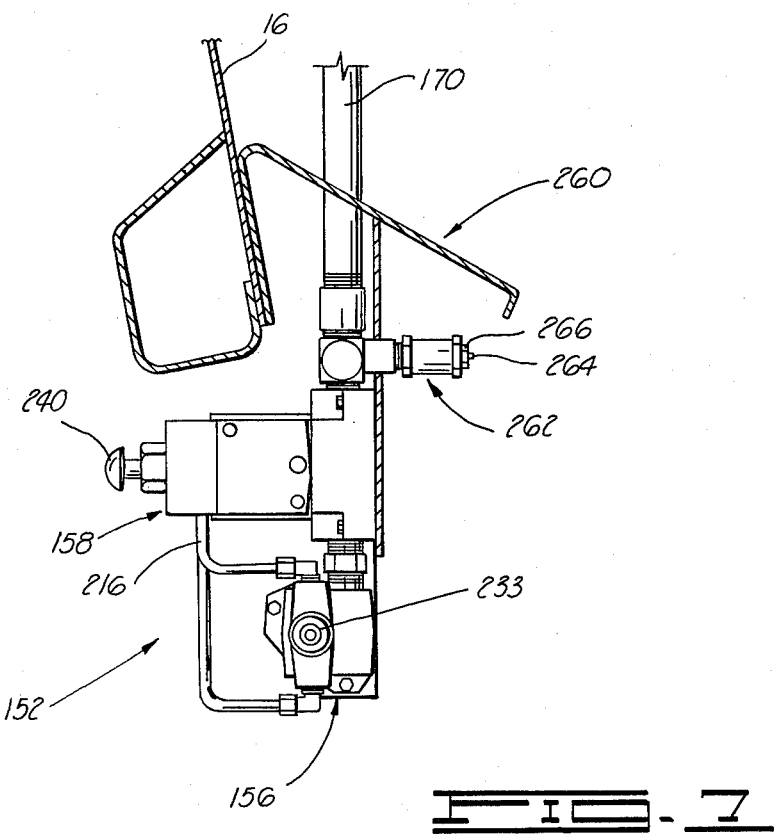

GATE ASSEMBLY AND CONTROL ASSEMBLY THEREFOR

BACKGROUND OF THE INVENTION

1. Field of the Invention

This invention relates to material hauling equipment and, more particularly, but not by way of limitation, to an improved gate and gate control assembly for semi-trailers wherein the gate control assembly selectively controls the movement of the gate assembly and thus the discharge of material from the semi-trailer.

2. Description of the Prior Art

In the construction of road beds, great masses of soil, gravel, and crushed rock must be picked up at the place of origin, transported to the road construction site, and deposited at the road construction site. Desirably the vehicles dump their load at the construction site as nearly as possible to where the material is to be placed on the road bed to minimize labor in spreading of the material. One conventional form of material handling equipment comprises a trailer drawn by a tractor. The trailer is provided with a hopper having a bottom discharge opening therein and a door assembly operably engaging the bottom discharge opening of the trailer for selectively discharging the carried material therethrough. Conventionally, the dump doors are activated by a hydraulic operator, and manual assemblies are employed to vary the size of the opening when the dump doors are activated.

While such material handling equipment has heretofore been widely employed, problems have nevertheless been encountered in the use of manual assemblies, such as manual flexisets, to control and regulate the opening of the gate assembly for the discharge of the material therethrough. For example, when using such manual assemblies problems have been encountered in that often a substantial quantity of material remains in the trailer and thus results in an ineffective dumping of the total load at the construction site. Further, many of the prior art material handling equipment do not allow operation of the gate assembly from the ground level. In instances where such ground control of the gate assembly is provided, problems have been incurred, such as the inadvertent discharge of the material by a bystander who becomes fascinated with the switches and palm push buttons that activate the gate assembly while the vehicle is unattended, such as when the driver has parked the vehicle for lunch at a truck stop.

Therefore, new and improved gate and gate control assemblies for material handling equipment, such as for a bottom discharge semi-trailer, are constantly being sought which are effective and efficient in operation, which substantially prevent inadvertent discharge of the material, and which will enable a full load of the material to be discharged without the use of manual assemblies, such as manual flexisets. Further, such improved gate and gate control assemblies desirably will be capable of both cab and ground control and enable an operator to perform a variety of functions using a minimum amount of mechanical parts and movements.

SUMMARY OF THE INVENTION

An object of the present invention is to provide an improved gate and gate control assembly for material handling equipment wherein the movement of the gate assembly can be controlled from the cab of the tractor and from ground level.

Another object of the invention is to provide an improved gate and gate control assembly for a bottom discharge trailer wherein the rate of discharge of the material from the trailer can readily be controlled and the contents of the trailer completely removed.

Another object of the present invention is to provide an improved gate and gate control assembly which will enable one to perform a variable of infinite functions employing a minimum amount of mechanical parts and movements.

Another object of the invention is to provide an improved gate and gate control assembly which does not suffer from the disadvantages of the prior art devices.

Other objects, features and advantages of the present invention will become apparent to those skilled in the art from a reading of the following detailed description when read in conjunction with the accompanying drawings which illustrate the invention.

According to the present invention an improved gate and gate control assembly for use on material handling equipment is provided wherein the discharge of the material from the equipment can readily be controlled and regulated by the gate assembly via the gate control assembly. Broadly, the improved gate and gate control assembly comprises a first and second gate member; connecting means for pivotably connecting the first and second gate members to the equipment and substantially synchronizing the movement of the first and second gate members such that the first and second gate members are movable between a closed position and an open position; a gate moving assembly operably connected to the first and second gate members for moving the first and second gate members between the closed position and the open position; and, a gate control assembly operably connected to the gate moving assembly, the gate control assembly having a first operational mode and a second operational mode, in the first operational mode the gate control assembly is actuated for positive closure of the first and second gate members, in the second operational mode the gate control assembly activating the gate moving assembly to selectively move the first and second gate members between the closed position and the open position.

More specifically, the gate control assembly comprises a pilot valve having a first state and a second state; a control valve openingly communicating with the gate moving assembly and a fluid source, the control valve selectively activating the gate moving assembly to move the first and second gate members when the pilot valve is in the second state, the control valve being non-responsive to electrical activation when the pilot valve is in the first state, the pilot valve in the first state maintaining the first and second gate members in the closed position via the gate moving assembly; and, a plurality of switches operably connected to the pilot valve and the control valve such that the pilot valve and the control valve can be selectively activated from the cab of the tractor or at ground level.

BRIEF DESCRIPTION OF THE DRAWINGS

FIG. 1 is a side elevational view of material handling semi-trailer attached to a tractor, the gate assembly of the semi-trailer being depicted in the closed position.

FIG. 2 is a side elevational view of the semi-trailer of FIG. 1 depicting one gate assembly of the semi-trailer in an open position and one gate assembly in a closed position.

FIG. 3 is a partially cutaway, front view of one of the gate assemblies of the semi-trailer of FIG. 1 taken along the line 3—3 of FIG. 1.

FIG. 4 is a broken, top plan view depicting one of the hoppers of the semi-trailer of FIGS. 1 and 2 taken along the line 4—4 of FIG. 2.

FIG. 6 is a partially cutaway, front view of a mounting assembly for mounting the pilot valve and the control valve of the gate control assembly to the semi-trailer.

FIG. 7 is a side elevational view of the mounting assembly for mounting the pilot valve and the control valve of the gate control assembly of FIG. 6 taken along the line 7—7.

DETAILED DESCRIPTION OF THE INVENTION

Figure 5:
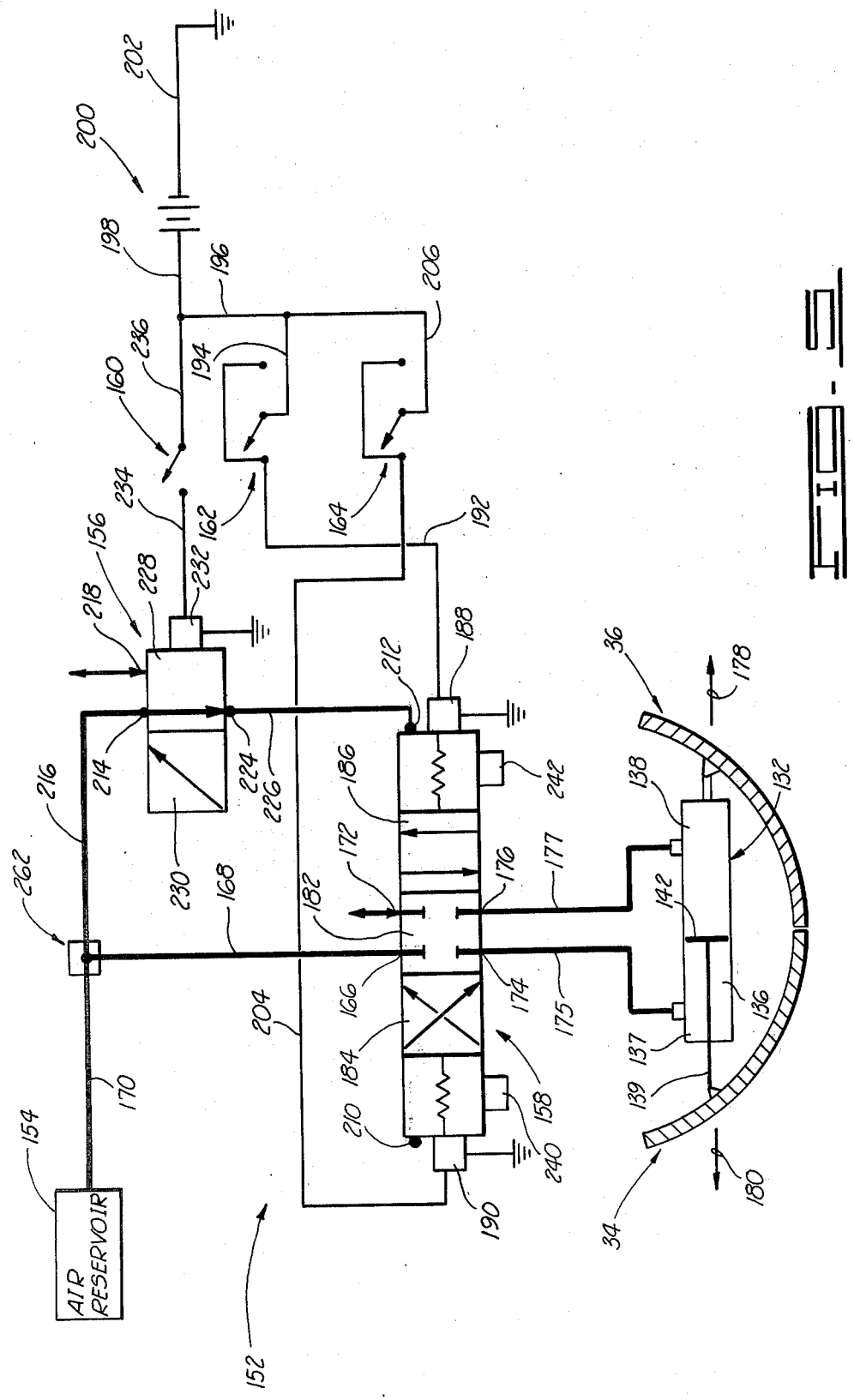
FIG. 5 is a schematic diagram of the gate control assembly of the present invention, the diagram depicting the plurality of switches, the pilot valve, and the control valve of the gate control assembly for selectively moving the first and second gate members of the gate assembly between the closed position and the open position.

Referring to the drawings, and particularly to FIGS. 1 and 2, a semi-trailer 10 is operably connected to a tractor 12 by a conventional fifth wheel 14. The semi-trailer 10, comprises a trailer frame 16 mounted on a plurality of wheels 18 by axles 20. The semi-trailer 10 is further provided with a body portion 22 mounted on the trailer frame 16, having tandemarranged hoppers 24, 26 positioned intermediate the front and rear portions of the semi-trailer 10. Each of the hoppers 24, 26 is provided with a bottom discharge opening, such as the bottom discharge opening 28 of the hopper 24 depicted in FIG. 4. The bottom discharge opening of each of the hoppers 24, 26, such as the bottom discharge opening 28 of the hopper 24, is controlled by a gate assembly 30, 32, respectively. The hoppers 24, 26 and the gate assemblies 30, 32 are substantially identical in construction. Thus, only the configuration and structure of the hopper 24 and the gate assembly 30 will be described in detail.

Referring now to FIG. 3, the gate assembly 30 comprises a first clamshell gate member 34, a second clamshell gate member 36, a connecting assembly 38 for pivotably connecting the first and second clamshell gate members 34, 36 to the trailer frame 16 via a plurality of bolsters, such as bolster 39, and a gate moving assembly 40 operably connected to the first and second clamshell gate members 34, 36. The gate moving assembly 40 cooperates with the connecting means 38 for moving the first and second clamshell gate members 34, 36 between the closed position and the opened position. Further, the connecting assembly 38 substantially synchronizes the movement of the first and second clamshell gate members 34, 36 as same are moved between the closed position and the open position by the gate moving assembly 40. In the closed position (as illustrated in FIG. 3) the first and second clamshell gate members 34, 36 are disposed substantially adjacent a lower side 42 of the hopper 24 such that the first and second clamshell gate members 34, 36 cooperate to prevent discharge of material from the hopper 24 via the bottom discharge opening 28 disposed in the lower side 42 of the hopper 26. In the open position (as partially depicted in FIG. 2) the first and second gate members 34, 36 are pivoted in an upward direction away from each other so that the bottom discharge opening 28, or at least a portion thereof, is unrestricted and the materials can be discharged from the hopper 24 via the bottom discharge opening 28.

Referring now to FIG. 4 the hopper 24 is provided with a first end 44, an opposed second end 46, a first side 48, a second side 50, and the lower side 42. As previously stated, the lower side 42 of the hopper 24 is provided with the bottom discharge opening 28 therein. The design and construction of the hopper 24 is conventional and thus no further detail is believed necessary.

The first clamshell gate member 34 of the gate assembly 30 is provided with a first side 60, an adjacent lower side 62, a first end 64 and an opposed second end 66. The second clamshell gate member 36 of the gate assembly 30 is provided with a first side 68, an adjacent lower side 70, a first end 72, and an opposed second end 74. The connecting assembly 38 (see FIG. 3) pivotably connects the first end 64 and the first end 72 of the first and second clamshell gate members 34, 36, respectively, to the bolster 39 such that the first ends 64, 72 of the first and second clamshell members 34, 36 are disposed a distance 76 from the first end 44 of the hopper 24. The opposed second ends 66, 74 of the first and second clamshell gate members 34, 36 are pivotably connected by a similar connecting assembly (not shown) to a bolster (also not shown) such that the opposed second ends 66, 74 of the first and second clamshell gate members 34, 36 are disposed a distance 78 from the opposed second end 46 of the hopper 24 as shown in FIG. 4. Further, the adjacent lower side 62, 70 of the first and second clamshell gate members 34, 36 abut one another and are disposed below the lower side 42 of the hopper 24 when the first and second clamshell gate members 34, 36 are in the closed position as depicted in FIGS. 3 and 4.

The first and second clamshell gate members 34, 36 are, as previously stated, carried by a plurality of bolsters, such as bolster 39. The bolsters are secured to the trailer frame 16 substantially as shown in FIG. 3. The bolsters are substantially identical in construction and configuration, and thus only one of such bolsters will be described. Further, the bolsters are secured to the trailer frame 16 so that upon attachment of the first and second clamshell gate members 34, 36 thereto, the distance 76 is provided between the first ends 64, 72 of the first and second clamshell gate members 34, 36 and the first end 44 of the hopper 24; and the distance 78 is provided between the opposed second ends 66, 74 of the first and second clamshell gate members 34, 36 and the opposed second end 46 of the hopper 24.

Referring to FIG. 3, an upper portion 82 of the first end 64 of the first clamshell gate member 34 is pivotably connected to one end portion 84 of the bolster 39 by any suitable means, such as pin 86; and an upper portion 88 of the first end 72 of the second clamshell gate member 36 is pivotably connected to an opposed end portion 90 of the bolster 39 by any suitable means, such as pin 92. The first ends 64, 72 of the first clamshell gate member 34 and the second clamshell gate member 36 are also pivotably connected through second upper end portions 94, 96, respectively, to a medial portion 98 of the bolster 39 via the connecting assembly 38 substantially as shown. The design and construction of the connecting assembly 38, in combination with the gate moving assembly 40, synchronized the movement of the first and second clamshell gate members 34, 36 as the first and second clamshell gate members 34, 36 are moved between the closed position and the open position as will be described in more detail hereinafter. The opposed second ends 66, 74 of the first and second clamshell gate members 34, 36 are similarly connected to a second bolster (not shown).

The connecting assembly 38 for pivotably connecting the first clamshell gate member 34 and the second clamshell gate member 36 to the trailer frame 16 via the bolsters, such as bolster 39, comprises a first connecting assembly 100 (operably connecting the first ends 64, 72 of the first and second clamshell gate members 34, 36 to the bolster 39) and a second connecting assembly (not shown) operably connecting the opposed second ends 66, 74 of the first and second clamshell gate members 34, 36 to another bolster (also not shown). Since the first connecting assembly 100 and the second connecting assembly (not shown) are substantially identical in structure and operation, only the first connecting assembly 100 will be described in detail.

The first connecting assembly 100 comprises a first linkage member 102 having a first end 104 and an opposed second end 106, a second linkage member 108 having a first end 100 and an opposed second end 112, and an equalizer bar 114 having a first end 116, a medial portion 118, and a second end portion 120. The first end 104 of the first linkage member 102 is pivotably connected to the second upper end portion 94 of the first end 64 of the first clamshell gate member 34 by any suitable means, such as pin 122, so that the opposed second end 106 of the first linkage member 102 extends substantially in the direction of the second clamshell gate member 36. The opposed second end 112 of the second linkage member 108 is pivotably connected to the second upper end portion 96 of the second clamshell gate member 36, by any suitable means, such as pin 124, such that the first end 110 of the second linkage member 108 extends substantially in the direction of the first clamshell gate member 34. The medial portion 118 of the equalizer bar 114 is pivotably secured to the medial portion 98 of the bolster 39 by any suitable means, such as a pin 126. The first end 116 of the equalizer bar 114 is pivotably connected to the first end 110 of the second linkage member 108 via pin 128; and the opposed second end 120 of the equalizer bar 114 is pivotably connected to the opposed second end 106 of the first linkage member 102 via pin 130.

As shown in FIG. 3 of the drawing, the equalizer bar 114, a substantially S-shaped member, is pivotably connected to the medial portion 98 of the bolster 39 such that the equalizer bar 114 is pivotably connected thereto substantially equal distance from the second upper end portion 94 of the first end 64 of the first clamshell gate member 34 and the second upper end portion 96 of the first end 72 of the second clamshell gate member 36. This arrangement and construction of the connecting assemblies provides equal gate opening and positive gate alignment in response to the gate opening assembly 40 as will be described hereinafter. Further, the connecting assembly 100, in combination with the gate opening assembly 40, provides minimum maintenance and quick discharge of materials from the hopper 26 through the bottom discharge opening 27 via movement of the first and second clamshell gate members 34, 36 from the closed position to the open position.

Referring to FIGS. 3 and 4, the gate moving assembly 40 comprises a first double-acting fluid cylinder 132 and a second double-acting fluid cylinder 134. The first double-acting fluid cylinder 132 is operably disposed between the first ends 64, 72 of the first and second clamshell gate members 34, 36, respectively, and the first end 44 of the hopper 24. The second double-acting fluid cylinder 134 is operably disposed between the opposed second ends 66, 74 of the first and second clamshell gate members 34, 36, respectively, and the opposed second end 46 of the hopper 24. Since the first double-acting fluid cylinder 132 and the second double-acting fluid cylinder 134 are identical in construction, as well as in attachment to the first and second clamshell gate members 34, 36, only the first double-acting fluid cylinder 132 (as depicted in FIG. 3), the attachment of the first double-acting fluid cylinder 132 to first and second clamshell gate members 34, 36, and the operation of the first double-acting fluid cylinder 132 will be described in detail.

The first double-acting fluid cylinder 132 comprises an elongated cylinder 136 having a first end 137 and an opposed second end 138, a reciprocating rod 139 operably disposed in the cylinder 136 such that one end 140 of the reciprocating rod 139 extends from the first end 137 of the cylinder 136. As depicted in FIG. 5, an opposed second end 141 of the reciprocating rod 139 is operably connected to a piston 142 disposed in the cylinder 136.

A first mounting assembly 144 is secured to the first clamshell gate member 34 at a position between the first end 64 of the first clamshell gate member 34 and the first end 44 of the hopper 24. The first mounting assembly 144 is pivotably connected to the end 140 of the reciprocating rod 139 by any suitable means, such as pin 146. A second mounting assembly 148 is secured to the second clamshell gate member 36 at a position between the first end 72 of the second clamshell gate member 36 and the first end 44 of the hopper 24. The second mounting assembly 148 is pivotably connected to the second end 138 of the cylinder 136 by any suitable means, such as pin 150.

The first double-acting fluid cylinder 132 and the second double-acting cylinder 134 are operably connected, via couplings and conduits (not shown, such being well known in the art) to a gate control assembly 152. The gate control assembly 152, which will be discussed in detail hereinafter, selectively activates the double-acting fluid cylinders, such as the double-acting fluid cylinder 132, to extend or retract the reciprocating rod 139. When the reciprocating rod 139 is moved to an extended position, the first and second clamshell gate members 34, 36 swing outwardly about their pivotal connections to the bolsters, such as bolster 39, thereby opening the gate assembly 30. Alternatively, when the reciprocating rod 139 is moved to a retracted position, the first and second clamshell gate members 34, 36 swing inwardly about their pivotal connections thereby closing the gate assembly 30.

The first and second double-acting fluid cylinders 132, 134, operably connected to the first and second clamshell gate members 34, 36 (as shown in FIG. 4), are synchronized by any suitable means, such as a leveling valve (not shown). Thus, the first and second double-acting cylinders 132, 134, in combination with the first connecting means 38 (and the second connecting means, not shown), synchronize the opening and closing movements of the first and second clamshell gate members 34, 36 in response to the gate control assembly 152 as will be discussed in detail hereinafter. Compressed air or hydraulic fluid may be supplied to either end of the first and second double-acting fluid cylinder 132, 134, such as the first end 137 of the cylinder 136 of the first double-acting fluid cylinder 132 for closing the clamshell gate members 34, 36, and the second end 138 of the cylinder 136 of the first double-acting fluid cylinder 132 for opening the clamshell gate members 34, 36. The control assembly 152 (which will be described in detail hereinafter with reference to FIG. 5) directs a controlled amount of compressed air or hydraulic fluid to the first end of the first and second double-acting fluid cylinders 132, 134, such as the first end 137 of the first double-acting fluid cylinder 132, when the first and second clamshell gate members 34, 36 are in the closed position so as to maintain pressure on the retracted reciprocating rod 139 of each of the cylinders 132, 134 and thus secure the first and second clamshell gate members 34, 36 in the closed position. For example, if compressed air from a supply reservoir 154 (see FIG. 5) of the semi-trailer 10 is employed as the activating source for the first and second double-acting fluid cylinders 132, 134 and, if the first and second clamshell gate members 34, 36 are to be maintained in the closed position, air is constantly supplied to the first end of the first and second double-acting fluid cylinders 132, 134. The air supplied to the first and second double-acting fluid cylinders 132, 134 is exhausted to the atmosphere via the second end 138 of the cylinders of the first and second double-acting fluid cylinders 132, 134 and the gate control assembly 152, as will be more fully described hereinafter. Alternatively, if the first and second clamshell gate members 34, 36 are to be moved to and maintained in the open position, air is supplied to the second end of the cylinder of the first and second double-acting fluid cylinders, such as the second end 138 of the cylinder 136 of the first double-acting fluid cylinder 132, so that the reciprocating rod, such as reciprocating rod 139, is extended a desired distance as will be more fully described hereinafter.

Referring now to FIGS. 5-7, the gate control assembly 152 for selectively activating the first and second double-acting fluid cylinders 132, 134 of the gate moving assembly 40 is depicted. As previously indicated, the gate control assembly 152 activates the gate moving assembly 40 for selectively moving the first and second clamshell gate members 34, 36 between the closed position and the open position.

The gate control assembly 152 of the present invention is provided with a first operational mode and a second operational mode. In the first operational mode the gate control assembly 152 maintains the first and second clamshell gate members 34, 36 in the closed position. In the second operational mode the gate control assembly 152 activates the gate moving assembly 40 to selectively move the first and second clamshell gate members 34, 36 between the closed position and the open position.

The gate control assembly 152 comprises pilot valve 156 having a first state and a second state, and a control valve 158 which openly communicates with the gate moving assembly 40 and the air reservoir 154. The pilot valve 156 is operably disposed between the air reservoir 154 and the control valve 158. When the pilot valve 156 is in the first state the control valve 158 is non-responsive to electrical activation. Alternately, when the pilot valve 156 is in the second state the control valve 158 is responsive to electrical activation and the gate moving assembly 40 can be selectively activated by the control valve 158 to move the first and second clamshell gate members 34, 36 between the closed position and the open position.

Referring more specifically to FIG. 5, the gate control assembly 152 further comprises a first switch 160, a second switch 162, and a third switch 164. The first, second and third switches, 160, 162 and 164 respectively, are positioned on a control panel (not shown) within a cab portion 165 of the tractor 12 (see FIGS. 1 and 2) so that the operator has control over the gate control assembly 152 from the cab portion 165 of the tractor 12. The first switch 160 is provided with an ON position and an OFF position. In the OFF position of the first switch 160 the pilot valve 156 is maintained in the first state and, in the ON position of the first switch 160 the pilot valve 156 is maintained in the second state.

The second switch 162 is provided with a continuous ON position, an OFF position, and a momentary ON position. Similarly, the third switch 164 is provided with a continuous ON position, an OFF position, and a momentary ON position. The first, second and third switches, 160, 162 and 164, respectively, in combination with the pilot valve 156 and the control valve 158, provide the operator with control over the movement of the first and second clamshell gate members 32, 34 as hereinbefore discussed.

Referring now to FIG. 5, the air reservoir 154 provides a source of pneumatic air for operating the double-acting fluid cylinders 132, 134, each of which is a pneumatic cylinder. The double-acting pneumatic cylinders, such as double-acting pneumatic cylinder 132, is connected to the clamshell gate members 34, 36 so that when the reciprocating rod 139 of the pneumatic cylinder 132 is extended via movement of the internal piston 142 in a direction 180, the first and second clamshell gate members 34, 36 are moved to the open position. Alternatively, when the reciprocating rod 139 of the pneumatic cylinder 132 is retracted via movement of the internal piston 142 in a direction 178, the first and second clamshell gate members 34, 36 are moved to the closed position.

As previously stated, the gate control assembly 152 generally comprises the pilot valve 156, the control valve 158, the first switch 160, the second switch 162, and the third switch 164 which are inter-connected as will now be explained. The control valve 158 (a two-way, blocked center, spool valve) is provided with an input port 166, which is connected to the air reservoir 154 via conduits 168 and 170; an exhaust port 172 which is open to the atmosphere; and two output ports 174 and 176 which establish fluid communication between the control valve 158 and the double-acting pneumatic cylinder 132.

Specifically, as indicated in FIG. 5, the output ports 174 and 176 of the control valve 158 are connected, via conduits 175 and 177, respectively, to the double-acting pneumatic cylinder 132 so as to move the piston 142 of the pneumatic cylinder 132, and thus the reciprocating rod 139, in the direction 178 at such times that the output port 174 fluidly communicates with the input port 166 of the control valve, and the output port 176 fluidly communicates with the exhaust port 172 of the control valve 158. Alternatively, at such times that the output port 174 fluidly communicates with the exhaust port 172 of the control valve 158, and the output port 176 fluidly communicates with input port 166, pneumatic pressure moves the piston 142 and thus the reciprocating rod 139 in the direction 180. As will be clear from FIG. 5, and the above description of the connection between the double-acting pneumatic cylinder 132 and the first and second clamshell gate members 34 and 36, the movement of the piston 142 in the direction 178 retracts the reciprocating rod 139 so as to move the first and second clamshell gate members 34, 36 to the closed position. The movement of the piston 142 in the direction 180 extends the reciprocating rod 139 of the double-acting pneumatic cylinder 132 so as to move the first and second clamshell gate members 34, 36 to the open position.

The control valve 158 has a neutral, or central section 182, a gate opening section 184, and a gate closing section 186 which have been schematically indicated in FIG. 5. The interposition of the neutral section 182 of the control valve 158 between the input and exhaust ports 166 and 172, respectively, and the output ports 174 and 176, isolates the double-acting pneumatic cylinder 132 so that the reciprocating rod 139 thereof (and thus the first and second clamshell gate members 34, 36) are held in a fixed position by air trapped on opposite sides of the piston 142 of the double-acting pneumatic cylinder 132.

When the gate opening section 184 of the control valve 158 is interposed between the input and exhaust ports, 166 and 172, respectively, and the output ports 174 and 176 of the control valve 158, pressurized air is transmitted to the opposed second end 138 of the cylinder 136 of the double acting pneumatic cylinder 132 via the input port 166 and the output port 176 of the control valve 158 and conduit 177. Air trapped in the first end 137 of the cylinder 136 of the double-acting pneumatic cylinder 132 is simultaneously exhausted therefrom via conduit 175 and outlet port 174 of the control valve 158 so that the reciprocating rod 139 is moved in the direction 180 to open the first and second clamshell gate members 34, 36.

When the gate closing section 186 of the control valve 158 is interposed between the input and output ports 166 and 174, respectively, and the output port 176 and the exhaust port 172 of the control valve 158, pressurized air is transmitted to the first end 137 of the cylinder 136 of the double-acting pneumatic cylinder 132 via the input port 166 and the output port 174 of the control valve 158, and the conduit 175. Air exits the cylinder 136 of the double-acting pneumatic cylinder 132 via conduit 177, outlet port 176 and the exhaust port 172 of the control valve 158 so that the reciprocating rod 139 is moved in the direction 178 to close the first and second clamshell gate members 34, 36.

The control valve 158 can be either pneumatically or electrically operated to selectively dispose one of the gate opening section 184 and gate closing section 186 between the input port 166 and exhaust port 172 (on one side of the enabled valve 158) and the output ports 174 and 176 (on the other side of the enabled valve 158). In the absence of either type of actuation of the control valve 158 the neutral section 182 is interposed between the ports 166 and 172 and the ports 174 and 176 so that the first and second clamshell gate members 34, 36 are held in a fixed position as has been described above.

The control valve 158 is electrically actuated by solenoids 188 and 190. The solenoids 188 and 190 are actuated by the second switch 162 and the third switch 164, respectively. Each of the solenoids 188 and 190 is grounded, and solenoid 188 can be connected via switch 162 and electrical conductors 192, 194, 196 and 198 to an ungrounded pole of a battery 200. The other pole of the battery is grounded via terminal 202. Similarly, the solenoid 190 can be connected via electrical conductors 204 and 206 and the electrical conductors 196 and 198 to the ungrounded pole of the battery 200.

Actuation of the solenoid 188 via the second switch 162 interposes the gate opening section 184 of the control valve 158 between the input and exhaust ports 166, 172, respectively, and the output ports 176 and 174, respectively, as hereinbefore described, so that the reciprocating rod 139 of the double-acting pneumatic cylinder is extended in the direction 180 and opens, or maintains in an open condition, the first and second clamshell gate members 34, 36.

On the other hand, actuation of the solenoid 190 via the third switch 164 interposes the gate closing section 186 of the control valve 158 between the input and exhaust ports 166 and 172, respectively, and the output ports 174 and 176, respectively, thereof as hereinbefore described, so that the reciprocating rod 139 of the double-acting pneumatic cylinder 132 is retracted (moved in the direction 178) and closes, or maintains in a closed condition, the first and second clamshell gate members 34, 36.

As previously stated, the second switch 162 has a continuous ON position, an OFF position, and a momentary ON position. In the OFF position the second switch 162 is open so that the solenoid 188 is in a non-actuated condition. In the continuous ON position the second switch 162 is closed and will remain closed so long as the actuating member (not shown) of the second switch 162 is undisturbed. On the other hand, in the momentary ON position the second switch 162 is closed only so long as the actuating member (not shown) is manually held in a position wherein the second switch is in the momentary ON position. Thus, the second switch 162 can be placed in the continuous ON position to continuously actuate the solenoid 188 so that, as described hereinbefore, the control 158 transmits pressurized air to the double-acting pneumatic cylinder 132 to open, or hold open, the first and second clamshell gate members 34, 36. The second switch 162 can also be momentarily placed in the momentary ON position during which time the solenoid 188 is actuated and pressurized air is transmitted, via the control valve 158, to the double-acting pneumatic cylinder 132 to move the first and second clamshell gate members 34, 36 towards the open position.

The third switch 164 is also provided with the continuous ON position, the OFF position, and the momentary ON position. In the OFF position the third switch 164 is open so that the solenoid 190 is a non-actuated condition. In the continuous ON position the third switch 164 is closed and will remain closed so long as the actuating member (not shown) of the third switch 164 is undisturbed. On the other hand, in the momentary ON position the third switch 164 is closed only so long as the actuating member (not shown) is manually held in a position wherein the third switch 164 can be placed in the continuous ON position to continuously actuate the solenoid 190 so that, as described hereinbefore, the control valve 158 transmits pressurized air to the double-acting pneumatic cylinder 132 to move the first and second clamshell gate members 34, 36 towards the closed position. The third switch 164 can also be momentarily placed in the momentary ON position during which time the solenoid 190 is actuated and pressurized air is transmitted, via the control valve 158, to the double-acting pneumatic cylinder 132 to move the first and second clamshell gate members towards the closed position.

For pneumatic actuation of the control valve 158, the control valve 158 is provided with a first pneumatic control port 210 openly communicating with the atmosphere, and a second pneumatic control port 212. The control valve 158 is constructed so that: (1) when atmospheric pressure communicates with second control port 212 of the control valve 158 via the pilot valve 156, as will be described hereinafter, the neutral section 182 of the control valve 158 will be interposed between the input and exhaust ports 166, 172, respectively and the output ports 174 and 176 of the control valve 158 (as hereinbefore described) and the solenoids 188, 190 will be in a non-actuated state. However, since the pneumatic pressure has been removed from the control valve 158, the control valve 158 can be electrically activated; and, (2) when pressure is transmitted to the second control port 212 of the control valve 158 via the pilot valve 156 and the first control port 210 of the control valve 158 communicates with the atmosphere as will hereinafter be described, the gate closing section 186 of the control valve 158 is interposed between the input and exhaust ports 166, 172, respectively, and the output ports 174, 176 of the control valve 158 (as hereinbefore described regardless of whether the solenoids 188, 190 are in an actuated or non-actuated state) and to actuate the double-acting pneumatic cylinder 132 and close, or hold closed, the first and second clamshell gate members 34, 36. That is, the pressure supplied by the air reservoir 154 via the pilot valve 158 is selected so as to be sufficient to permit pneumatic actuation of the control valve 158 to override electrical actuation thereof for positive closure of the first and second clamshell gate member 34, 36.

The pilot valve 156 is provided with an input port 214, an exhaust port 218, and an output port 224. The input port 214 of the pilot valve 156 fluidly communicates with the air reservoir 154 via a conduit 216 and the conduit 170; and the exhaust port 218 openly communicates with the atmosphere. The output port 224 of the pilot valve 156 fluidly communicates with the second control port 212 of the control valve 158 via a conduit 226.

The pilot valve 156 is further provided with a first section 228 and a second section 230. When the first section 228 of the pilot valve 156 is interposed between the input port 214 and the output port 224 of the pilot valve 156, the pilot valve 156 is in the first state. Thus, in the first state of the pilot valve 156, the first section 228 of the pilot valve 156 interconnects the output port 224 with the input port 214, such that pneumatic pressure can be supplied to control valve 158 via the pilot valve 156, conduit 226 and the second control port 212 of the control valve 158. The configuration of the first section 228 of the pilot valve 156 (in combination with the configuration of the control valve 158) allows pneumatic pressure to be transmitted to the first end 137 of the first double-acting pneumatic cylinder 132 (via the control valve 158) when the pilot valve 156 is in the first state to maintain pressure on the first end 137 of the pneumatic cylinder 132 and thus hold the first and second clamshell gate members 34, 36 in the closed position. Such is accomplished by transmitting pneumatic pressure from the air reservoir 154 (via conduit 170, 216, the input port 214 and the output port 224 of the pilot valve 156) to the second control port 212 of the control valve 158 (via conduit 226) while atmospheric pressure is maintained on a portion of the control valve 158 via the first control port 210 of the control valve 158. The resulting differential in pressure across the control valve 158 causes the gate closing section 186 of the control valve 158 to be interposed between the input and exhaust ports 166 and 172, respectively (on one side of the control valve 158) and the output ports 174 and 176 (on the other side of the control valve 158) as hereinbefore described. Thus, when the pilot valve 156 is in the first state, pneumatic pressure is directed to the first end 137 of the cylinder 136 of the double-acting pneumatic cylinder 132 (via the control valve 158) so that pressure is maintained on the piston 142 of the double-acting cylinder 132 to maintain the reciprocating rod 139 in the retracted position and thus secure the first and second clamshell gate members 34, 36 in the closed position. Further, when the pilot valve 156 is in the first state the control valve 158 is non-responsive to electrical actuation by the second and third switches 164, 166, respectively.

The pilot valve 156 can be placed in the second state, the actuated state, either electrically via the first switch 160 and a solenoid 232, or manually by a push rod (not shown) operably connected to a push button assembly 233 disposed on the pilot valve 156 as depicted in FIG. 7. The solenoid 232 is grounded (as depicted in FIG. 5) and connected to the first switch 160 via an electrical conductor 234. The first switch 160 is connected to the ungrounded terminal of the battery 200 via an electrical conductor 236 and the electrical conductor 198. Thus, the first switch 160 can be closed, i.e., moved to the ON position, to energize the solenoid 232 so that the pilot valve 156 is placed in the second state; or, the first switch can be opened, i.e., moved to the OFF position, so that the solenoid 232 is de-energized and the pilot valve 156 is placed in the first state.

To activate the control valve 158 (so that the control valve 158 is responsive to the second and third switches 164, 166, respectively, to selectively move the first and second clamshell gate members 34, 36 between the closed position and the open position), the first switch 160 is moved to the ON position. As previously stated, by moving the first switch to the ON position the pilot valve 156 is positioned in the second state. In the second state the second section 230 of the pilot valve 156 is interposed between the exhaust port 218 (on one side of the pilot valve 156) and the output port 224 (on the other side of the pilot valve 156) so that the fluid communication is established between the output port 224 and the exhaust port 218 of the pilot valve 156. As can be more clearly seen in FIG. 5, when the pilot valve 156 is in the second state, atmospheric pressure is directed to the second control port 212 of the control valve 158 which results in the interposition of the neutral section 182 of the control valve 158 between the input and exhaust ports 166, 172, respectively, (on one side of the control valve 158) and the output ports 174, 176 (on the other side of the control valve 158) since atmospheric pressure is constantly maintained on the first control port 210 of the control valve 158. When the neutral section 182 of the control valve 158 is interposed between the input and exhaust ports 166, 172, respectively, and the output ports 174, 176 as hereinbefore described, the movement of the first and second clamshell gate members 34, 36 can be electrically controlled via the second switch 162 or the third switch 164. For example, the solenoid 188 (in response to signals from the second switch 162) selectively interposes the gate opening section 184 of the control valve 158 between the input and exhaust ports 166, 172, respectively, (on one side of the control valve 158) and the output ports 174, 176 (on the other side of the control valve 158), as hereinbefore described, which results in the gate members 34, 36 moving from the closed position to the open position. Alternatively, the solenoid 190 (in response to signals from the third switch 164) selectively interposes the gate closing section 186 of the control valve 158 between the input and exhaust ports 166, 172, respectively, (on one side of the control valve 158) and the output ports 174, 176 (on the other side of the control valve 158), as hereinbefore described, which results in the gate members 34, 36 moving from the open position to the closed position.

As previously stated, the first, second and third switches 160, 162 and 164, respectively, are positioned within the cab portion 165 of the tractor 12 so that the operator has electrical control over the movement of the gate assembly 30 from the cab portion 164. Further, the unique arrangement and interconnections between the first, second and third switch 160, 162, 164, respectively, the pilot valve 156, and the control valve 158 maintains the gate assembly 30 in a positive closed position when the first switch 160 is in the OFF position (i.e., the pilot valve 156 is in the first state). This prevents accidental opening of the gate assembly 30 via the second switch 160.

While the positioning of the first, second and third switches 160, 162 and 164, respectively, within the cab portion 165 of the tractor 12 enables the operator to control the movement of the gate assembly 30, it is also desirable that the gate assembly 30 be operative from the ground level. Such can readily be accomplished (as depicted in FIGS. 5-7) by mounting the pilot valve 156 and the control valve 158 on the semi-trailer 10 so that same are readily accessible. Further, to provide ground control over the gate moving assembly 30, the control assembly 152 further comprises a fourth switch 240 and a fifth switch 242. Since an electrical failure may occur, it is preferable that the fourth and fifth switches 240, 242 be pneumatic switches. In other words, when the fourth and fifth switches 240, 242 are manually depressed to position same in the momentary ON position, as will be described in more detail hereinafter, the switches 240, 242 activate a valve (not shown) so that pneumatic pressure shifts the control valve 158 and one of the gate opening section 184 and the gate closing section of the control valve 158 are interposed between the input and the exhaust ports 166, 172, respectively, and the output ports 174, 176 of the control valve 158 as hereinbefore described. Since control valves having pneumatic switches are well known in the art, no further description of the interconnection of the control valve 158 and the fourth and fifth switches 240, 242 is deemed necessary.

Referring now to FIG. 5, the fourth switch 240 is operably connected to the control valve 158. The fourth switch 240, has an OFF position and a momentary ON position. In the OFF position, the fourth switch 240 is open. In the momentary ON position, the fourth switch 240 is closed only so long as the actuating member 248 (see FIG. 6) is manually depressed so that the fourth switch 240 is in the momentary ON position. When the fourth switch 240 is in the momentary ON position, (and provided the first switch 160 is in the ON position or, the push button assembly 233 is actuated, as will be more fully described hereinafter), pressurized air is transmitted, via the control valve 158, to the double-acting pneumatic cylinder 132 to move the first and second clamshell gate members 34, 36 toward the open position.

The fifth switch 242 is operably connected to the control valve 158. The fifth switch 242 has an OFF position and a momentary ON position. In the OFF position the fifth switch 242 is open. In the momentary ON position the fifth switch 242 is closed only so long as the actuating member 254 is manually depressed so that the fifth switch 242 is in the momentary ON position. When the fifth switch 242 is in the momentary ON position (and provided the first switch 160 is in the ON position, or the push button assembly 233 is activated, as will be more fully described hereinafter) pressurized air is transmitted, via the control valve 158, to the double-acting pneumatic cylinder 132 to move the first and second clamshell gate member 34, 36 from an open position towards the closed position.

In the event of an electrical failure, such as when the electrical connection between the tractor 12 and the semi-trailer 10 becomes disconnected or broken, the pilot valve 156, if not already in the first state, spring shifts automatically to the first state. When an electrical failure occurs, (or if the operator desires to actuate the gate moving assembly from the ground using the fourth and fifth switches 240, 242 without returning to the cab portion 165 of the tractor 12 and moving the first switch 160 to the ON position), the operator can manually override the pilot valve 156 by depressing the push button assembly 233.

The push button assembly 233 is operably connected to the solenoid 232 of the pilot valve 156 such that upon depressing the push button assembly 233, the solenoid 232 is manually activated to place the pilot valve 156 in the second state. The pilot valve 156 will be maintained in the second state as long as the push button assembly 233 is in the depressed condition. Thus, the operator can selectively move the first and second clamshell gate members 34, 36 from the closed position to an open position by depressing the push button assembly 233 and moving the fourth switch 240 to the momentary ON position. Once the first and second clamshell gate members have been moved to the desired open position, the fourth switch 240 can be released. However, if the operator employs the push button assembly 233 to override the pilot valve 156, and if the operator desires to maintain the first and second clamshell gate members 34, 36 in the open position until the material has been removed from the semi-trailer 10, the operator must keep the push button assembly 233 depressed. When the push button assembly 233 is released the pilot valve 156 will return to the first state and the first and second clamshell gate members 34, 36 will return to the closed position.

As depicted in FIGS. 6 and 7, the fourth switch 240 and the fifth switch 242 are push palm buttons. The fourth switch 240 enables the operator to pneumatically open the first and second clamshell gate members 34, 36 either incrementally or as a continuous operation. The incremental opening of the first and second clamshell gate members 34, 36 can be achieved by depressing the push palm button and thereafter releasing it. While the push palm button is in the depressed condition the first and second clamshell gate members 34, 36 are moved from the closed position to the open position. Upon release of the push palm button of the fourth switch 240 (such that the push palm button is not in a depressed condition) the movement of the first and second clamshell gate members 34, 36 stops. Thus, is one desires to open the first and second clamshell gate members 34, 36 to the full open position, such can be achieved by depressing the push palm button of the fourth switch 240 and holding same in the depressed condition until the first and second clamshell gate members 34, 36 are in the full open position.

The fifth switch 242 is employed to pneumatically move the first and second clamshell gate members 34, 36 to the closed position. Such can be done either incrementally or in a continuous manner. For example, by depressing the push palm button of the fifth switch 242 the first and second clamshell gate members 34, 36 are moved towards the closed position. Upon releasing the push palm button of the fifth switch 242 the movement of the first and second clamshell gate members 34, 36 stops. If the operator desires that the first and second clamshell gate members 34, 36 be continuously closed by depressing the push palm button of the fifth switch 242 until the first and second clamshell gate members 34, 36 have been moved to the fully closed position. Thus, the operation of the fourth switch 240 and the fifth switch 242 enable the operator to move the first and second clamshell gate members 34, 36 between the open position and the closed position so that all material within the hopper 24 can readily be removed. Further, it should be noted that with practice the operator can adjust the first and second clamshell gate members 34, 36 to control the flow of materials through the bottom discharge opening 28 of the hopper 24 as if the operator and the gate assembly had gate stops or a flexiset assembly. Further, the unique configuration and combination of elements of the first and second clamshell gate members 34, 36, the connecting means 38 for pivotably connecting the first and second clamshell gate members 34, 36, the gate moving assembly 40, and the gate control assembly 152 of the present invention enable an operator to adjust and control movement of the first and second clamshell gate members 34, 36 from the cut portion 165 of the tractor 12, or from ground level, and avoid many of the problems which operators have incurred in the past in the discharging of material via the bottom discharge openings of hoppers employing the gate moving assemblies of the prior art.

The pilot valve 156 and the control valve 158 can be mounted on the semi-trailer 12 by any suitable means, such as a mounting bracket 260 as depicted in FIGS. 6 and 7. The pilot valve 156, and thus the control valve 158, are operably connected, and in fluid communication with the air reservoir 154 of the semi-trailer 10 as hereinbefore described.

In order to control the speed of the movement of the first and second clamshell gate members 34, 36 between the closed position and the open position, a flow restricter and muffler exhaust assembly 262 can be employed. The flow restricter and muffler exhaust assembly 262 is operably disposed to fluidly communicate with the air reservoir 154, the pilot valve 156 and the control valve 158 via conduits 170, 216 and 168, respectively. The flow restricter and muffler exhaust assembly 262 can be provided with an air restricter adjustment screw 264 and a jam nut 266. By adjusting the adjustment screw 264 one can readily control the speed of the movement of the first and second clamshell gate members 34, 36.

The pilot valve 156 employed in the gate control assembly 152 of the present invention can be any suitable valve having the characteristics and capabilities hereinbefore described. Typical of a valve useful as the pilot valve 156 is a three-way pacer solenoid valve Model 1614A 2020, marketed by Ross Operating Valve Co., 120 East Golden Gate Avenue, Detroit, Mich. 48203.

Similarly, the control valve 158 employed in the gate control assembly 152 of the present invention can be any suitable valve having the characteristics and capabilities hereinbefore described. Typical of a valve useful as the control valve 158 is a double solenoid, pilot operated, three positioned, string center, all ports closed valve Model 159K91 marketed by Ross Operating Valve Co., 120 East Golden Gate Avenue, Detroit, Mich. 48203.

In order to more fully describe the present invention the following mode of operation is set forth.

OPERATION

The combination and interconnection of the pilot valve 156, the control valve 158, the first switch 160, the second switch 162, the third switch 164, the fourth switch 240, the fifth switch 242, and the push button assembly 233 provide both cab and ground control, as well as electrical and pneumatic control, of the gate moving assembly 40. Thus, the unique combination of the above-mentioned components allows the operator to perform a variable of infinite functions with a minimum of mechanical parts and movements. Further, the unique gate control assembly 152 of the present invention allows the operator to electrically control the gate moving assembly 40 from the cab portion 165 of the tractor 12 via the first switch 160, the second switch 162 and the third switch 164; and to pneumatically control the gate moving assembly 40 from the ground level via the first switch 160 or the push button assembly 233, the fourth switch 240, and the fifth switch 242.

In normal operation, such as when the semi-trailer 10 is to be loaded with material or the material is to be transported from one location to another, the first switch 160, the second switch 162, and the third switch 164 are each positioned in their OFF positions. Because the first switch 160 is in the OFF position the pilot valve 156 is in the first state. Thus, the first and second clamshell gate members 34, 36 cannot be inadvertently opened via either the second switch 162 or the fourth switch 240. Further, to prevent the first and second gate members 34, 36 from creeping open during the movement of a load of material, which could result from an air leak in an air conduit or the double-acting pneumatic cylinders, air is supplied to the first end of the double-acting pneumatic cylinders via the pilot valve 156 and the control valve 158 to insure that the first and second clamshell gate members 34, 36 are, by positive pressure, maintained in the closed position.

In normal situations, when the material is to be discharged from the hopper 24 of the semi-trailer 10, (i.e., the electrical connections between the tractor 12 and the semi-trailer 10 are operable), the operator can control the rate of discharge of the material from the hopper 24 via the bottom discharge opening 28 by controlling the movement of the first and second clamshell gate members 34, 36. Further, the discharge of the material from the hopper 12 can be achieved by the operator from the cab portion 165 of the tractor 12. For example, when the material is to be removed from the hopper 24, the operator can partially open the first and second gate members 34 and 36 by moving the first switch 160 to the ON position (and thereby shifting the pilot valve 156 to the second state) and thereafter moving the second switch 162 to the momentary ON position to incrementally move the first and second clamshell gate members 34 and 36 between the closed position and the open position. When the operator determines that the first and second clamshell gate members 34, 36 have been moved a sufficient distance, the second switch 162 is released and returned to the OFF position from the momentary ON position. Once the material has been substantially discharged from the hopper 24 of the semi-trailer 10, and to insure that the material has been completely removed therefrom, the operator can move the second switch 162 to the continuous ON position to fully open the first and second clamshell gate members 34, 36. Once the first and second clamshell gate member 34, 36 have been moved to the open position, the second switch 162 is returned to the OFF position. Upon returning the first switch 160 to the OFF position, the pilot valve 156 is shifted to the first state and the first and second clamshell gate members 34, 36 are moved to the closed position. As an alternative, the operator can move the first and second clamshell gate members 34, 36 to the closed position by moving the third switch 164 to either the ON position or the momentary ON position. If the third switch 164 is employed to close the first and second clamshell gate members 34, 36, the third switch 164 should be moved to the OFF position once the gates have been closed. However, as previously indicated, the operator does not need to employ the third switch 164 to move the first and second clamshell gate members 34, 36 to the closed position as such can be accomplished by moving the first switch 160 to the OFF position.

In instances where the operator desires to employ ground control of the gate moving assembly 40 rather than control from the cab portion 165 of the tractor 12, such can be accomplished via the first switch 160, the fourth switch 240 and the fifth switch 242. Further, as hereintofore indicated, in the event of a malfunction of the first switch 160, a defect in the electrical connections between the tractor 12 and the semi-trailer 10, or if the operator so desires, the push button assembly 233 can be employed to manually shift the pilot valve 156 to the second state so that the gate moving assembly 40 can be activated by the fourth switch 240. However, in normal operations, the first switch 160 will be moved to the ON position to shift the pilot valve 156 to the second state. Thereafter, control of the gate moving assembly 40 can be accomplished from ground level via the fourth switch 240 and the fifth switch 242.

While the subject invention has been described in terms of certain preferred embodiments, and illustrated by certain drawings, such are intended for illustrative purposes only and alternatives and equivalents may readily occurr to those skilled in the art without departing from the spirit or scope of the invention as set forth in the appended claims.

What is claimed is:

1. In a material dispensing vehicle having a pressurized fluid source, a hopper with a bottom discharge opening for discharging the material therefrom, and a gate assembly operably connected to the vehicle such that the gate assembly is moveable between one of a closed position and an opening position, in the closed position the gate assembly preventing discharge of material from the hopper via the bottom discharge opening, in the open position the gate assembly allowing discharge of the material from the hopper via the bottom discharge opening, the improvement wherein the gate assembly comprises:

a first gate member;

a second gate member;

connecting means for pivotably connecting the first gate member and the second gate member to the vehicle such that the first and second gate members are moveable between the closed position and the open position;

a gate moving assembly operably connected to the first and second gate members for moving the first and second gate members between the closed position and the open position; and a control assembly operably connected to the gate moving assembly and the pressurized fluid source, the control assembly having a first operational mode and an alternative second operational mode, in the first operational mode of the control assembly the first and second gate members being positioned and maintained in the closed position via the pressurized fluid source and the gate moving assembly, in the second operational mode the control assembly being selectively activated to move the first and second gate members between one of the closed position and the open position by the pressurized fluid source and the gate moving assembly, the control assembly comprising:

a pilot valve having a first state and a second state;

a control valve operably connected between the gate moving assembly and the pressurized fluid source, the pilot valve operably connected between the pressurized fluid source and the control valve so as to place the control valve in a condition wherein the control valve directs pressurized fluid to the gate moving assembly to maintain the first and second gate members in the closed position at such times that the pilot valve is in the first state thereof while leaving the control valve in a condition wherein the control valve can be selectively activated to selectively move the first and second gate members between one of the closed position and the open position via the pressurized fluid source and the gate moving assembly at such times that the pilot valve is in the second state thereof.

2. In the material dispensing vehicle of claim 1 the control valve being further characterized as having a gate opening section, a neutral section, and a gate closing section, the gate closing section of the control valve being interposed between the gate moving assembly and the pressurized fluid source when the pilot valve is in the first state, the control valve being shifted so that the neutral section of the control valve is interposed between the gate moving assembly and the pressurized fluid source when the pilot valve is moved to the second state so that the control valve can be selectively activated to interpose one of the gate opening section and the gate closing section between the gate moving assembly and the pressurized fluid source.

3. In the vehicle of claim 1 wherein:

the hopper is provided with a first end, an opposed second end, a first side, a second side and a lower side, the lower side having the bottom discharge opening disposed therein;

the first gate member is provided with a first side, an adjacent lower side, a first end and an opposed second end;

the second gate member is provided with a first side, an adjacent lower side, a first end and an opposed second end; and the connecting means pivotably connects the first end of the first gate member and the first end of the second gate member to the first end of the hopper such that the first ends of the first and second gate members are disposed a distance from the first end of the hopper, and the adjacent lower side of each of the first and second gate members abut one another and are disposed substantially adjacent the lower side of the hopper when the first and second gate members are in the closed position, the connecting means substantially synchronizing movement of the first and second gate members as same are moveable between one of the closed position and the open position.

4. In the vehicle of claim 3 wherein the connecting means for pivotably connecting the first and second gate members to the hopper comprises:

a first connecting assembly operably connecting the first ends of the first and second gate members to the first end of the hopper; and a second connecting assembly operably connecting the opposed second ends of the first and second gate members to the opposed second end of the hopper.

5. In the vehicle of claim 4 wherein the first connecting assembly comprises:

a first linkage member having a first end and an opposed second end, the first end being pivotably connected to the first end of the first gate member such that the opposed second end extends substantially in the direction of the second gate member;

a second linkage member having a first end and an opposed second end, the opposed second end being pivotably connected to the first end of the second gate member such that the first end extends substantially in the direction of the first gate member; and an equalizer bar having a first end, a medial portion, and an opposed second end, the first end of the equalizer bar pivotably connected to the opposed second end of the first linkage member, the opposed second end of the equalizer bar pivotably connected to the first end of the second linkage member, and the medial portion of the equalizer bar pivotably connected to an upper portion of the first end of the hopper substantially equidistance from the first ends of the first and second gate members.

6. In the dump vehicle of claim 4 wherein the second connecting assembly comprises:

a first linkage member having a first end and an opposed second end, the first end pivotably connecting to the opposed second end of the first gate members such that the opposed second end of the first linkage member extends substantially in the direction of the second gate members;

a second linkage members having a first end and an opposed second end, the opposed second end pivotably connected to the opposed second end of the second gate member such that the first end extends substantially in the direction of the first gate member; and an equalizer bar having a first end, a medial portion, and an opposed second end of the first linkage member, the opposed second end of the equalizer bar pivotably connected to the first end of the second linkage member, and the medial portion of the equalizer bar pivotably connected to an upper portion of the opposed second end of the hopper substantially equidistance from the opposed second ends of the first and second gate members.

7. In the vehicle of claim 3 wherein the gate moving assembly comprises:

a double-acting pneumatic cylinder having a reciprocating rod operably disposed therein such that one end of the reciprocating rod extends from the cylinder;

a first mounting assembly secured to the first gate member at a position between the first end of the first gate member and the first end of the hopper, the first mounting assembly pivotably connecting the one end of the reciprocating rod to the first gate members; and a second mounting assembly secured to the second gate member at a position between the first end of the second gate member and the first end of the hopper, the second mounting assembly pivotably connecting the cylinder to the second gate member.

8. In the vehicle of claim 7 wherein the cylinder is characterized as comprising an elongated body member having a first end portion and an opposed second end portion, the first end portion of the body member having a first fluid inlet, the opposed second end portion of the body member having a second fluid inlet, each of the first and second fluid inlets operably connected to and in fluid communication with the control valve such that when the control valve is in the responsive condition fluid can be selectively delivered to the cylinder via one of the first and second fluid inlets to move the reciprocating rod between a retracted position and an extended position such that the first and second gate members can be moved between the closed position and the open position via the connecting assembly and movement of the reciprocating rod.

9. In the vehicle of claim 8 wherein the pilot valve, in the first state, cooperates with the control valve to provide an effective amount of pneumatic pressure to the cylinder via the first inlet of the cylinder to maintain the reciprocating rod in the retracted position and secure the first and second gate members in the closed position.

10. In the vehicle of claim 2 wherein the control assembly further comprises:

pilot valve switch means operably connected to the pilot valve for selectively shifting the pilot valve from the first state to the second state; and control valve switch means operably connected to the control valve for selectively shifting the control valve from the neutral position to one of the gate opening position and the gate closing position when the pilot valve is in the second state.

11. In the vehicle of claim 10 wherein the control assembly further comprises:

a pilot valve override assembly operably connected to the pilot valve, the override assembly being adapted to manually shift the pilot valve from the first state to the second state, the override assembly cooperating with the control valve switch means such that upon activation of the override assembly the pilot valve moves from the first state to the second state, and upon maintaining the pilot valve in the second state via the override assembly, the control valve switch means can be moved to activate the gate moving assembly to selectively move the first and second gate members between one of the closed position and the open position.

12. In the vehicle of claim 2 wherein the control assembly further comprises:

a first switch operably connected to the pilot valve, the first switch having an ON position and an OFF position, in the OFF position of the first switch the pilot valve being maintained in the first state and the control valve in a gate closing position, in the ON position the first switch energizing the pilot valve such that the pilot valve is shifted into the second state and the control valve is shifted to a neutral position so that the control valve is responsive to electrical activation;

a second switch operably connected to the control valve, the second switch having a momentary ON position, an OFF position, and a continuous ON position, in the momentary ON position the second switch moving the control valve to the gate opening position such that, when the pilot valve is in the second state, the control valve activates the gate moving assembly to incrementally move the first and second gate members from the closed position to the open position, in the continuous ON position the second switch moving the control valve to the gate opening position, when the pilot valve is in the second state, so that the control valve activates the gate moving assembly to continuously move the first and second gate members between the closed position and the open position; and a third switch operably connected to the control valve, the third switch having a momentary ON position, an OFF position, and a continuous ON position, in the momentary ON position the third switch moving the control valve to the gate closing position such that, when the pilot valve is in the second state, the control valve activates the gate moving assembly to incrementally move the first and second gate members from the open position to the closed position, in the continuous On position the third switch moving the control valve to the gate closing portion, when the pilot valve is in the second state, so that the control valve activates the gate moving assembly to continuously move the first and second gate members between the open position and the closed position.

13. In the vehicle of claim 12 wherein the vehicle is a tractor-trailer combination, the tractor having a cab portion containing a control panel, the first, second, and third switches being disposed on the control panel.

14. In the vehicle of claim 13 wherein the pilot valve and the control valve are mounted on the trailer, and the control assembly further comprises:

a fourth switch operably connected to the control valve, the fourth switch having a momentary ON position and an OFF position, in the momentary ON position the fourth switch moving the control valve to the gate opening position such that, when the pilot valve is in the second state, the control valve activates the gate moving assembly to move the first and second gate member between the closed position to the open position; and a fifth switch operably connected to the control valve, the fifth switch having a momentary ON position and an OFF position, in the momentary ON position the fifth switch moving the control valve to the gate closing position such that, when the pilot valve is in the second state, the control valve activates the gate moving assembly to move the first and second gate members between the open position and the closed position.

15. In the vehicle of claim 14 wherein the control assembly further comprises:

a pilot valve override assembly operably connected to the pilot valve, the override assembly being adapted to manually shift the pilot valve from the first state to the second state, the override assembly cooperating with the fourth and fifth switches such that upon employing the override assembly to manually shift the pilot valve to the second state, and thereafter maintaining the pilot valve in the second state via the override assembly, one of the fourth and fifth switches can be moved to the momentary ON position to activate the gate moving assembly and selectively move the gate members between one of the closed position and the open position.

16. An improved gate control assembly for selectively controlling the movement of a gate assembly of a bottom discharging vehicle, the gate assembly characterized as having a first gate member and a second gate member, the first and second gate members moveable between a closed position and an open position by a fluid responsive gate moving assembly operably connected to the first and second gate members and a pressurized fluid source, the improved gate control assembly comprising:

a pilot valve having a first state and a second state;

a control valve operably connected between the gate moving assembly and the pressurized fluid source, the pilot valve operably connected between the pressurized fluid source and the control valve so as to place the control valve in a condition wherein the control valve directs pressurized fluid to the gate moving assembly to maintain the first and second gate members in the closed position at such times that the pilot valve is in the first state thereof while leaving the control valve in a condition wherein the control valve can be selectively activated to selectively move the first and second gate members between one of the closed position and the open position via the pressurized fluid source and the gate moving assembly at such times that the pilot valve is in the second state thereof.

17. The improved gate control assembly of claim 16 wherein the control valve is characterized as having a gate opening section, a neutral section, and a gate closing section, the gate closing section of the control valve being interposed between the fluid source and the gate moving assembly when the pilot valve is in the first state, the control valve being shifted such that the neutral section of the control valve is interposed between the fluid source and the gate moving assembly when the pilot valve is moved to the second state so that one of the gate opening section and the gate closing section of the control valve can be selectively interposed between the fluid source and the gate moving assembly.

18. The improved gate control assembly of claim 16 wherein the gate moving assembly comprises a double-acting fluid cylinder having a reciprocable rod operably extendable therefrom, the fluid cylinder having a first fluid inlet and a second fluid inlet, the first and second fluid inlets being in fluid communication with the control valve such that upon directing an effective amount of fluid to the fluid cylinder via the first fluid inlet the first and second gate members are maintained in the closed position.

19. The improved gate control assembly of claim 17 which further comprises:
   switch means operably connected to the pilot valve for selectively shifting the pilot valve from the first state to the second state; and
   switch means operably connected to the control valve for selectively shifting the control valve to selectively activate the gate moving assembly to move the first and second gate members between the closed position and the open position when the pilot valve is in the second state.

20. The improved gate control assembly of claim 19 which further comprises:
   a pilot valve override assembly operably connected to the pilot valve, the override assembly being adapted to manually shift the pilot valve from the first state to the second state, the override assembly cooperating with the control valve switch means such that upon activation of the override assembly to shift the pilot valve from the first state to the second state, and maintaining the pilot valve in the second state via the override assembly, the control valve switch means can be moved to activate the gate moving assembly to selectively move the gate members between one of the open positions and the closed position.

21. The improved gate control assembly of claim 17 which further comprises:
   a first switch operably connected to the pilot valve, the first switch having an ON position and an OFF position, in the OFF position of the first switch the pilot valve being maintained in the first state and the control valve being in gate closing condition, in the ON position the first switch energizing the pilot valve such that the pilot valve is shifted into the second state;
   a second switch operably connected to the control valve, the second switch having a momentary ON position, an OFF position, and a continuous ON position, in the momentary ON position the second switch energizing the control valve to selectively interpose the gate opening section of the control valve between the fluid source and the gate moving assembly so that the first and second gate members are incrementally moveable from the closed position to the open position when the second switch is maintained in the momentary ON position, in the continuous ON position the second switch energizing the control valve to selectively interpose the gate opening section of the control valve between the fluid source and the gate moving assembly so that the first and second gate members are moveable between the closed position and the open position; and
   a third switch operably connected to the control valve, the second switch having a momentary ON position, an OFF position, and a continuous ON position, in the momentary ON position the second switch energizing the control valve to selectively interpose the gate closing section of the control valve between the fluid source and the gate moving assembly so that the first and second gate members are incrementally moveable from the open position to the closed position when the third switch is maintained in the momentary ON position, in the continuous ON position the third switch energizing the control valve to selectively interpose the gate closing section between the fluid source and the gate moving assembly so that the first and second gate members are moveable between the open position and the closed position.

22. The improved gate control assembly of claim 21 wherein the bottom discharge vehicle is a trailer, the trailer being operably connected to a tractor, the tractor having a cab portion, the cab portion having a control panel, and the first, second and third switches being disposed on the control panel.

23. The improved gate control assembly of claim 22 wherein the pilot valve and the control valve are mounted on the trailer, and the gate control assembly further comprises:
   a fourth switch operably connected to the control valve, the fourth switch having a momentary ON position an OFF position, in the momentary ON position the fourth switch when the pilot valve is in the second state, selectively interposing the gate opening section of the control valve between the fluid source and the gate moving assembly so that the first and second gate members are incrementally moveable from the closed position to the open position when the fourth switch is maintained in the momentary ON position; and
   a fifth switch operably connected to the control valve, the fifth switch having a momentary ON position and an OFF position, in the momentary ON position the second switch when the pilot valve is in the second state, selectively interposing the gate closing section of the control valve between the fluid source and the gate moving assembly so that the first and second gate members are incrementally moveable from the open position to the closed position when the third switch is maintained in the momentary ON position.

24. The improved gate control assembly of claim 23 which further comprises:
   a pilot valve override assembly operably connected to the pilot valve, the override assembly being adapted to manually shift the pilot valve from the first state to the second state, the override assembly cooperating with the fourth and fifth switches such that upon employing the override assembly to manually shift the pilot valve to the second state, and thereafter maintaining the pilot valve in the second state via the override assembly, one of the fourth and fifth switches can be moved to the momentary ON position to activate the gate moving assembly and selectively move the gate members between one of the open position and the closed position.

* * * * *